United States Patent [19]

Zaleski

[11] Patent Number: 4,981,730

[45] Date of Patent: Jan. 1, 1991

[54] LOW VOC AQUEOUS COATING COMPOSITIONS AND COATED SUBSTRATES

[75] Inventor: Richard R. Zaleski, Mentor, Ohio

[73] Assignee: Man-Gill Chemical Company, Cleveland, Ohio

[21] Appl. No.: 354,218

[22] Filed: May 19, 1989

[51] Int. Cl.$^5$ ............................................... B05D 3/02
[52] U.S. Cl. ................................. 427/393.5; 252/502; 252/512; 252/518; 428/412; 428/483; 428/516; 524/523; 524/525; 524/571
[58] Field of Search ............... 252/500, 502, 512, 513, 252/514, 520; 427/393.5; 523/413; 524/507, 513, 514, 523, 525, 571; 428/412, 483, 516

[56] References Cited

U.S. PATENT DOCUMENTS

| | | |
|---|---|---|
| 1,846,247 | 2/1932 | Bruson . |
| 1,853,334 | 4/1932 | Bruson . |
| 3,855,085 | 12/1974 | Rushmere ........................ 204/55 R |
| 4,424,240 | 1/1984 | Kielbania ........................ 427/393.5 |

OTHER PUBLICATIONS

Witcobond W-240, Apr. 1986, Organics Division, Witco Corporation, 3 pages.
Witcobond W-232, Witcobond W-234, Apr., 1986, Organics Division, Witco Corp., 5 pp.
Eastman Chlorinated Polyolefins in Coatings for Selected Plastics, Eastman Kodak Company, 5 pp.
Cymel 370,373 and 380, Cross-Linking Agents, American Cyanamid Company, Wayne, N.J., 3 pp.
Synotex 800 Cyclized Rubber for Coatings, Daniel Products Co., Jersey City, N.J., 1 p.

Primary Examiner—Michael Lusignan
Attorney, Agent, or Firm—Renner, Otto, Boisselle & Sklar

[57] ABSTRACT

In accordance with the present invention, there is provided an aqueous and low VOC composition which is particularly useful as a coating composition for non-porous substrates. The aqueous compositions comprise
(A) at least one water-dispersible or emulsifiable olefin polymer;
(B) at least one non-ionic surfactant;
(C) at least one anionic surfactant;
(D) at least one volatile organic liquid; and
(E) water.

Preferably, the aqueous compositions are in the form of oil-in-water emulsions. The invention also relates to a process of preparing the low VOC oil-in-water emulsions, and to the use of such coating compositions as adherent primer coatings for substrates, and in particular, non-porous substrates.

57 Claims, No Drawings

LOW VOC AQUEOUS COATING COMPOSITIONS AND COATED SUBSTRATES

TECHNICAL FIELD

This invention relates to low VOC aqueous compositions, and more particularly to such aqueous compositions which are useful as coating compositions. The compositions are particularly suitable as primer coatings on non-porous substrates such as plastics.

BACKGROUND OF THE INVENTION

Polymers and other plastics have been developed which are useful in many applications including automotive parts, engineering plastics, toys, containers, molded items and packaging films. It is often desirable to decorate or to protect items made from these plastics by applying a coating or an aesthetically pleasing design to the plastic. It is obviously important that the coating is tightly bonded to the plastic surface. Plastic surfaces as well as certain non-plastic surfaces such as metal including aluminum and galvanized steel are not particularly receptive to the application of adherent coatings because the surfaces are essentially non-porous. Accordingly, there is a continuing need for coating compositions which exhibit excellent adhesion to plastics and metals, and in particular, to plastics.

Improved adhesion of decorative and protective coating compositions to various substrates, and in particular, non-porous substrates, has been achieved by the application of base coats or primer coats to the substrate prior to the application of the desired decorative coating. Since primer coatings are not visible, they do not have to possess all of the desirable characteristics of the top coatings such as color retention, mar-resistance, chalk-resistance, dirt-resistance, etc. Thus, primer coatings can be formulated with major emphasis on adhesion to substrates, and adhesion to subsequent basecoats and/or topcoats.

For many years, curable coating compositions useful as paints, varnishes, etc., have been dissolved in volatile hydrocarbon solvents to facilitate the deposition of thin films on the substrates to be coated and to enable the solvent to evaporate into the atmosphere within a reasonable period of time leaving a dry non-tacky coating. The use of such volatile hydrocarbon solvents as diluents, therefore, results in air pollution problems.

More recently, the coatings industry has directed its attention to the problem of volatile organic emissions from organic coating compositions. These efforts have been encouraged by various governmental and state agencies concerned with the air pollution caused by the use of volatile hydrocarbon solvents. Such efforts by the coatings industry has resulted in the development of a number of high-solids resin coating formulations which contains significantly reduced amounts of solvents, and, in some instances, little or no solvent.

Some difficulty has been observed in coating certain substrates with these high solids, low solvent coating composition which generally contain significant amounts of water. Primer coatings deposited on non-porous substrates such as plastic and metals generally exhibit poor adhesion, particularly when topcoats are applied over the primer coating.

SUMMARY OF THE INVENTION

In accordance with the present invention, there is provided an aqueous and low VOC composition which is particularly useful as a coating composition for non-porous substrates. The aqueous compositions comprise
(A) at least one water-dispersible or emulsifiable olefin polymer;
(B) at least one non-ionic surfactant;
(C) at least one anionic surfactant;
(D) at least one volatile organic liquid; and
(E) water.

Preferably, the aqueous compositions are in the form of oil-in-water emulsions. The invention also relates to a process of preparing the low VOC oil-in-water emulsions, and to the use of such coating compositions as adherent primer coatings for substrates, and in particular, non-porous substrates.

DESCRIPTION OF THE PREFERRED EMBODIMENTS

The aqueous compositions of the present invention are characterized as being low VOC (volatile organic content), and in particular, by a VOC of less than about 3.5 pounds/gallon. VOC is defined as the ratio of solvent to non-volatile solids. The water present in the aqueous composition does not enter into the calculation.

(A) Water-Dispersible or Emulsifiable Olefin Polymers.

The aqueous composition of the present invention contain (A) at least one water-dispersible or emulsifiable olefin polymer. Any water-dispersible or emulsifiable olefin polymer can be utilized in the aqueous compositions of the present invention provided that the aqueous compositions containing such olefin polymers deposit an adherent coating on non-porous substrates. The olefin polymers which have been found to be particularly useful in the aqueous compositions of the present invention include cyclized olefin rubbers, halogenated polyolefins, halo-sulfonated polyolefins, and mixtures thereof. Cyclized olefin rubbers and mixtures of cyclized olefin rubbers with chlorinated polyolefins are particularly useful. Cyclized olefin rubbers found to be useful in the coating compositions of the present invention include the cyclized rubbers obtained by isomerization of linear polyolefins such as polyisoprene into ring structures. More particularly, the cyclized rubber can be made by condensing rubber with metallic or metalloid halide catalysts such as stannic chloride, titanium tetrachloride, ferric chloride and antimony pentachloride in a suitable solvent. Upon treatment of the resultant product with acetone or alcohol, the cyclized rubber is formed and recovered. Other procedures for preparing cyclized rubber are described in U.S. Pat. Nos. 1,798,188; 1,846,247; 1,853,334; and 2,052,931. The solvent may be an aromatic solvent such as toluene, xylene, benzene, and high-flash aromatic naphthas.

A commercially available cyclized olefin rubber found to be useful in the coating compositions of the present invention, either alone or in combination with other olefin polymers such as chlorinated polyolefins is a cyclized rubber derived from synthetic rubber by isomerization of the linear polyisoprene. This material is available from Daniel Products Company, Jersey City, New Jersey, under the general trade designation Synotex 800.

The water-dispersible or emulsifiable olefin polymer utilized in the aqueous compositions of the present invention also may be chlorinated polyolefins such as chlorinated polyethylene, chlorinated polypropylene, mixtures of chlorinated polyethylene and chlorinated polyolefin, etc. Chlorosulfonated polyolefins such as chlorosulfonated polyethylene and chlorosulfonated polypropylene also may be utilized.

Examples of chlorinated polyolefins which are useful in the aqueous compositions of the present invention include the chlorinated polyolefins available from Eastman Chemical Products, Inc. under the designations CP-343-1 and CP-343-3 which are chlorinated polyolefins in various concentrations of xylene including solutions containing 40% and 50% of the chlorinated polyolefins in xylene. Commercially available chlorosulfonated polyethylenes are available from the DuPont Company under the general trade designation Hypalon Synthetic Rubber.

Chlorosulfonated olefins such as chlorosulfonated polyethylene are derived from the reaction of a mixture of chlorine and sulfur dioxide on any of the various polyethylenes. The product of this reaction is a chemically modified form of the original polyethylene, and the product may contain from 20% to about 40% chlorine and about 1% to 2% sulfur present mostly as secondary sulfonyl chloride groups (RR'CHSO$_2$Cl). The sulfonyl chloride groups are available as cross-linking or curing sites.

The aqueous compositions of the present invention also contain (B) at least one non-ionic surfactant and (C) at least one anionic surfactant. These surfactants are known in the art, and many of these are described in McCutcheon's "Detergents and Emulsifiers", 1979, North American Edition, Published by McCutcheon's Division, MC Publishing Corp., Glen Rock, New Jersey, pp. 15-20 which lists a number of anionic and non-ionic surfactants is hereby incorporated by reference for the disclosure in this regard. The non-ionic and anionic surfactants may be added to the aqueous compositions directly, or the surfactant may be present in some of the other components used to form the aqueous compositions of the invention. For example, some commercial resin dispersions contain surfactants for stability. In these instances, the amount of surfactant added to the aqueous compositions can be reduced in proportion to the amount of surfactant supplied by resin dispersions used to form the aqueous compositions.

(B) Non-Ionic Surfactants.

In general, nonionic surfactants such as those containing ether linkages are particularly useful in the aqueous compositions of the invention. Examples of such ether-containing surfactants are those having the general formula $$R_1-O-[(CH_2)_nO]_xH$$

wherein $R_1$ is an aryl or alkyl group containing from about 6 to about 20 carbon atoms, n is 2 or 3, and x is an integer between 2 and 100. Such surfactants are produced generally by treating fatty alcohols or alkyl-substituted phenols with excess ethylene oxide or propylene oxide. The alkyl carbon chain may contain from about 14 to about 24 carbon atoms and may be derived from a long chain fatty alcohol such as oleyl alcohol or stearyl alcohol.

Nonionic polyoxyethylene compounds of this type are described in U.S. Pat. No. 3,855,085. Such polyoxyethylene compounds are available commercially under the general trade designations "Surfynol" by Air Products and Chemicals, Inc. of Allentown, Pennsylvania, and under the designation "Pluronic" or "Tetronic" by BASF Wyandotte Corp. of Wyandotte, Michigan. Examples of specific polyoxyethylene condensation products include "Surfynol 465" which is a product obtained by reacting about 10 moles of ethylene oxide with 1 mole of tetramethyldecynediol. "Surfynol 485" is the product obtained by reacting 30 moles of ethylene oxide with tetramethyldecynediol. "Pluronic L 35" is a product obtained by reacting 22 moles of ethylene oxide with polypropylene glycol obtained by the condensation of 16 moles of propylene oxide. Also useful is Atlox 1045A from ICI America, Inc. Which is a polyoxyalkylene sorbitol oleate-laurate mixture.

Non-ionic surfactants also are available from Rohm & Haas Company under the general trade designation "Triton". For example, Triton CF10 is an alkyl aryl polyether.

Amine, long chain fatty amine, long chain fatty acid, alkanol amines, diamines, amides, alkanol amides and polyglycol-type surfactants known in the art are also useful. One type found particularly useful is the group obtained by the addition of a mixture of propylene oxide and ethylene oxide to diamines. More specifically, compounds formed by the addition of propylene oxide to ethylene diamine followed by the addition of ethylene oxide are useful and are available commercially from BASF Wyandotte Inc. Chemical Company under the general trade designation "Tetronic".

Carbowax-type wetting agents which are polyethylene glycols having different molecular weight have been found to give good results. For example, Carbowax No. 1000 has a molecular weight range of from about 950 to 1050 and contains from 20 to 24 ethoxy units per molecular. Carbowax No. 4000 has a molecular weight range of from about 3000 to 3700 and contains from 68 to 85 ethoxy units per molecule. Other known nonionic glycol derivatives such as polyalkylene glycol ethers and methoxy polyethylene glycols which are available commercially can be utilized as surfactants in the compositions of the invention.

(C) Anionic Surfactants.

Anionic surfactants also are present in the aqueous compositions of the invention. Among the useful anionic surfactants are the widely-known metal carboxylate soaps, organo sulfates, sulfonates, sulfocarboxylic acids and their salts, and phosphates. Various anionic surfactants are readily available commercially, and further information about anionic surfactants can be found in the text "Anionic Surfactants" Parts II and III, edited by W. M. Linfield, published by Marcel Dekker, Inc., New York, 1976. Examples of anionic surfactants available from ICI America, Inc. include Atlas G-2205 which is an aromatic phosphate and Atlas G-3300 which is an alkyl aryl sulfonate. Examples of anionic surfactants available from Rohm & Haas Company include Triton 770 which is a dioctyl sodium sulfosuccinate, Triton H-55 which is a phosphate surfactant, potassium salt, Triton W-30 and Triton X200 which are sodium salts of alkyl aryl polyether sulfonates, etc. An example of an anionic surfactant available from Witco Corporation is Witconate P1059 which is a hydrocarbon soluble isopropylamine salt of dodecyl benzene sulfonic acid.

(D) Volatile Orqanic Liquid.

In addition to water, the aqueous compositions of the present invention also contain at least one volatile organic liquid. In one preferred embodiment, the aqueous compositions contain a mixture of at least one aliphatic hydrocarbon and at least one aromatic hydrocarbon. Suitable solvents include mineral spirits, hexane, cyclohexane, methyl ethyl ketone, methyl isobutyl ketone, alcohols such as ethyl alcohol, propyl alcohol and diacetone alcohol, dimethylphthalate, polyols such as ethylene glycol and propylene glycol, mono- and dialkyl ethers of alcohols and glycols such as butylcarbitol(2-(2-butoxy-ethoxy)ethanol, ethylene glycol monoethylether, ethylene glycol monobutylether, ethylene glycol monoethylether acetate, diethyleneglycol monobutylether and diethylene glycol diethylether. Examples of aromatic solvents include xylene, toluene, aromatic petroleum distillates, aromatic naphthas, etc.

The aqueous compositions of the present invention are preferably emulsions and more preferably oil-in-water emulsions. In one embodiment, the aqueous compositions will comprise (A) from about 3% to about 25% by weight of at least one water-dispersible or emulsifiable olefin polymer;

(B) from about 0.1% to about 5% by weight of at least one non-ionic surfactant;

(C) from about 0.02% to about 2.5% by weight of at least one anionic surfactant;

(D) from about 5% to about 20% by weight of at least one volatile hydrocarbon liquid; and (E) from about 40% to about 80% by weight of water.

One process for preparing the low VOC oil-in-water emulsions of the present invention comprises the steps of (A) preparing an aqueous mixture comprising at least one water-soluble non-ionic surfactant;

(B) preparing a mixture of at least one olefin polymer, at least one anionic surfactant, and at least one hydrocarbon solvent; and (C) adding the aqueous mixture prepared in step (A) to the hydrocarbon mixture prepared in step (B) with agitation. Initially, a water-in-oil emulsion is formed as the aqueous mixture is being added. When the amount of water added is equal to or greater than the amount of solvent present, the emulsion is converted to an oil-in-water emulsion wherein the water is a continuous phase. Invert emulsions prepared in this manner appear to be more stable than ordinary oil-in-water emulsions containing the same ingredients.

It should be understood that in addition to the components described above, the aqueous coating compositions of the present invention also may contain pigments. In one preferred embodiment, the pigments are incorporated into the coating composition by mixing the pigments with the aqueous mixture prepared in step (A) above which also contains at least one water-soluble non-ionic surfactant.

A variety of pigments can be utilized in the compositions of the present invention. Inorganic pigments which are useful include metal powders such as aluminum or bronze, titanium dioxide, silica, iron oxide red, talc, mica, clay, zinc oxide, aluminum oxide, magnesium oxide, strontium chromate, zinc chromate, cadmium sulfide, carbon black, lead chromate, zinc chromate, molybdate orange, calcium carbonate and barium sulfate. Organic pigments also can be used and these include Para Red, Lithol Rubine, Halio Bordeaux, Thio Indigo, Thio Indigoid, Toluidine, Dioxazine, Red Lake C, Red Lake R, Anthraquinone, Xylidide, Phthalocyanine Blue, Phthalocyanine Green, Azo, etc.

The aqueous compositions of the present invention also may contain at least one water-dispersible or emulsifiable cross-linking resin. Cross-linking resins are included in the aqueous compositions particularly when the compositions are to be used to deposit primer coatings which are subsequently to be coated with a basecoat or topcoat containing a cross-linkable thermosetting resin. The cross-linking resin can be any cross-linking resin which is reactive with the functional groups of the cross-linkable thermosetting resin in the basecoat or topcoat.

A variety of cross-linking resins can be utilized in the aqueous compositions of the invention, and these include, for example, aminoplast resins, urethane resins, acrylic resins, epoxy resins, alkyd resins, phenol-formaldehyde resins, etc., and mixtures thereof. When it is desired to include a cross-linking resin in the aqueous compositions of the present invention, and in particular in the invert oil-in-water emulsion prepared by the process described above, the cross-linking resin may be added to the mixture prepared in step (B), namely, the mixture of at least one olefin polymer, at least one anionic surfactant and at least one hydrocarbon solvent. Alternatively, the cross-linking resin may be added to the oil-in-water emulsion after it is formed in step (C) above. The amount of cross-linking resins incorporated into the aqueous compositions of the present invention may be any amount up to about 60% by weight, based on the weight of the olefin polymer present in the aqueous composition.

The particular cross-linking resin chosen will depend upon the nature of the olefin polymer, the properties which are desired in modifying the olefin polymer and the type of cross-linkable thermosetting resin in the coating deposited over the primer. For example, when harder coatings are desirable, use of aminoplast resins and epoxy resins generally are recommended. Mixture of the cross-linking resins also can be utilized in some applications.

Aminoplast resins are based on the addition products of aldehydes such as formaldehyde with an amino- or amido-group carrying substance. Condensation products obtained from the reactions of formaldehyde with melamine, urea or benzoguanamine are most common and preferred. These condensation products can be monomeric or polymeric. Condensation products of other amines and amides can also be employed, for example, aldehyde condensates of triazines, diazines, triazoles, guanadines, guanamines and alkyl- and aryl-substituted derivatives of such compounds including alkyl- and aryl-substituted ureas and alkyl- and aryl-substituted melamines. Some examples of such compounds are N,N'-dimethylurea, benzourea, dicyandiamide, 2-chloro-4,6-diamino-1,3,5-triazine and 3,5-diamino-triazole. Other examples of melamine and urea-based cross-linking resins include alkylated melamine resins including methylated melamine-formaldehyde resins such as hexamethoxymethylmelamine, alkoxymethyl melamines and ureas in which the alkoxy groups have 1-4 carbon atoms such as methoxy, ethoxy, propoxy, or butoxymethyl melamines and dialkoxymethyl ureas; alkylol melamines and ureas such as hexamethylol melamine and dimethylol urea. The aminoplast cross-linking resins are particularly useful when the cross-linkable thermosetting resin in the next coating is an alkyd resin, a polyester resin, an epoxy resin or an acrylic resin.

Some particularly useful commercially available aminoplast resins are amino resins sold by American Cyanamid under the general trade designation CYMEL. In particular, CYMEL 301, CYMEL 303 and CYMEL 1156, all of which are alkylated melamine-formaldehyde resins, are useful herein. Additional melamine-formaldehyde resins available from American Cyanamid include CYMEL 350, 370, 373, 380, 1116, 1130 and 1158. Benzoguanamines are available from American Cyanamid as CYMEL 1123, 1125 and 1134. Partially alkylated melamine resins from American Cyanamid include CYMEL 235, 243, 245, 248, 255, 270 and 280.

The cross-linking resin utilized in the primer coating compositions of the present invention may be urethane resins. The polyurethane resins useful in the invention are those formed by reacting an organic diisocyanate with an active hydrogen-containing material such as polyalkylene ether glycols and hydroxy-terminated polyesters to form isocyanate-terminated polyurethane prepolymers which can be cross-linked or cured with known agents such as compounds having at least two amino nitrogen atoms each having at least one reactive hydrogen atom. Alternatively, the active hydrogen compound, organic diisocyanate and chain extender can be reacted in one shot to form the desired polymer.

In the preparation of polyester-urethane elastomers, there preferably are used hydroxy-terminated polyesters prepared by polycondensation of an aliphatic dicarboxylic acid and a molar excess of an aliphatic glycol, and those prepared by ring-opening polymerization of a cyclic ester of the presence of a difunctional compound as an initiator. The polyesters obtainable by polycondensation of an aliphatic dicarboxylic acid and an aliphatic glycol are exemplified by those obtained by reaction between adipic acid, sebacic acid, maleic acid and other dicarboxylic acids with ethylene-glycol, 1,2-propylene glycol, 1,4-butylene glycol, 1,3-butylene glycol, etc. Examples of the polyesters prepared by polymerization of cyclic esters are those prepared by epsilon-caprolactone, delta-methyl-epsilon-caprolactone and beta-propiolactone in the presence of an initiator such as, for example, 1,4-butylene glycol, ethylene glycol or diethylene glycol.

The polyalkylene ether urethanes are those prepared by reacting the isocyanates with polymeric polyhydroxy compounds which include polyether polyols such as polyalkylene ether glycols, polyalkylene arylene ether-thioether glycols and polyalkylene ether triols. The polyalkylene ether glycols and triols are preferred and these include glycols having the formula $HO(RO)_nH$ wherein R is an alkylene radical which need not necessarily be the same in each instance, and n is an integer. Representative glycols include polyethylene ether glycol, polypropylene ether glycol and polytetramethylene ether glycol. Representative polyalkylene ether triols are made by reacting one or more alkylene oxides with one or more low molecular weight aliphatic triols. The alkylene oxide most commonly used have molecular weights between about 44 and 250 and these include ethylene oxide, propylene oxides, butylene oxides, 1,2-epoxybutane and 2,3-epoxybutane. The ethylene, propylene and butylene oxides are preferred. The aliphatic triols most commonly used have molecular weights between about 92 and 250. Examples include glycerol, 1,2,6-hexane triol and 1,1,1-trimethylol propane.

Representative examples of the polyalkylene ether triols include: polypropylene ether triol (molecular weight 700) made by reacting 608 parts of 1,2-propylene oxide with 92 parts of glycerin; and polypropylene ether triol (molecular weight 6000) made by reacting 5,866 parts of 1,2-propylene oxide with 132 parts of 1,2,6-hexane triol.

Other active hydrogen-containing compounds which can be reacted with polyisocyanates to form urethanes useful in the coating compositions of the invention are long-chain polymers containing at least two groups having at least one active hydrogen atom as determined by the Zerewitinoff method. Examples of such compounds include in addition to the polyesters and polymeric polyhydroxy compounds described above, polyamides, polyepoxides, reaction products of phenols and alkylene oxides, formaldehyde resins, hydrogenation products of olefin-carbon monoxide copolymers and polyepihalohydrins.

The alkyd cross-linking resins are obtained by reacting a dihydric or polyhydric alcohol and a polybasic acid or anhydride in the presence of a drying oil using known techniques. Examples of the dihydric or polyhydric alcohols include glycerol, pentaerythritol, sorbitol and diethylene glycol. Examples of the polybasic acids or anhydrides include phthalic acid, isophthalate acid, maleic anhydride, fumaric anhydride, nonconjugated linoleic acid, oleic acid, adipic acid, azelaic acid, sebacic acid, tetrachlorophthalic anhydride, and chlorendic anhydride. Examples of the drying oils include soybean oil, linseed oil, dehydrated castor oil, non-oxidizing castor and coconut oils, tung oil, fish oil, sunflower oil, walnut oil, safflower seed oil and tall oil. These alkyd resins may be produced, for example, by direct fusion of glycerol, phthalic anhydride and drying oil at a temperature in the range of from about 210° C. to about 235° C. Solvents are then added to adjust the solids content. The amount of drying oil varies depending on the intended use. With respect to the high solids compositions of the invention, the level of drying oil is preferably minimized.

The epoxy resins useful in the present invention as cross-linking resins include any one of a number of well-known organic resins which are characterized by the presence therein of the epoxide group

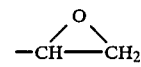

A wide variety of such resins are available commercially. Such resins have either a mixed aliphatic-aromatic or an exclusively non-benzeneoid (i.e., aliphatic or cycloaliphatic) molecular structure.

The mixed aliphatic-aromatic epoxy resins which are useful with the present invention are prepared by the well-known reaction of a bis(hydroxy-aromatic)alkane or a tetrakis-(hydroxyaromatic)-alkane with a halogen-substituted aliphatic epoxide in the presence of a base such as, e.g., sodium hydroxide or potassium hydroxide. Under these conditions, hydrogen halide is first eliminated and the aliphatic epoxide group is coupled to the aromatic nucleus via an ether linkage. Then the epoxide groups condense with the hydroxyl groups to form polymeric molecules which vary in size according to the relative proportions of reactants and the reaction time.

In lieu of the epichlorohydrin, one can use halogen-substituted aliphatic epoxides containing about 4 or more carbon atoms, generally about 4 to about 20 carbon atoms. In general, it is preferred to use a chlorine-substituted terminal alkylene oxide (terminal denoting that the epoxide group is on the end of the alkyl chain) and a particular preference is expressed for epichlorohydrin by reason of its commercial availability and excellence in forming epoxy resins useful for the purpose of this invention.

If desired, the halogen-substituted aliphatic epoxide may also contain substituents such as, e.g., hydroxy keto, nitro, nitroso, ether, sulfide, carboalkoxy, etc.

Similarly, in lieu of the 2,2-bis-(p-hydroxyphenyl)-propane, one can use bis-(hydroxyaromatic) alkanes containing about 16 or more carbon atoms, generally about 16 to about 30 carbon atoms such as, e.g., 2,2-bis-(1-hydroxy-4-naphthyl)-propane; 2,2-bis-(o-hydroxyphenyl)propane; 2,2-bis-(p-hydroxyphenyl) butane, 3,3-bis-p-hydroxyphenyl)hexane; 2-(p-hydroxyphenyl)-4-(1-hydroxy-4-naphthyl)octane, 5-5-bis-(p-hy-droxy-o-methylphenyl)-decane, bis-(p-hydroxyphenyl) methane, 2,2-bis-(p-hydroxy-o-isopropylphenyl)propane, 2,2-bis-(o,p-dihydroxyphenyl)propane, 2-(p-hydroxyphenyl)-5-(o-hydroxyphenyl)hexadecane, and the like. If desired, the bis-(hydroxyaromatic)alkane may contain substituents such as, e.g., halogen, nitro, nitroso, ether, sulfide, carboalkoxy, etc. In general, it is preferred to use a bis-(p-hydroxyphenyl)alkane since compounds of this type are readily available from the well-known condensation of phenols with aliphatic ketones or aldehydes in the presence of a dehydrating agent such as sulfuric acid. Particularly preferred is 2,2-bis-(p-hydroxyphenyl)propane, which is available commercially as "Bisphenol A".

The acrylic resins are obtained by polymerizing a suitable combination of a functional group-containing monomer and another copolymerizable monomer in an ordinary manner. The polymerization temperature is ordinarily between about 60° C. and about 100° C, and polymerization time is usually within a range of about 3 to about 10 hours. Examples of the functional group-containing monomers include hydroxyl group-containing monomers such as beta-hydroxyethyl acrylate, beta-hydroxypropyl acrylate, beta-hydroxyethyl methacrylate, beta-hydroxypropyl methacrylate, N-methylol acrylamide and N-methylol methacrylamide; carboxyl group-containing monomers such as acrylic acid, methacrylic acid, itaconic acid, maleic acid, fumaric acid, as well as monoesters of maleic acid and fumaric acid with monoalcohols; alkoxyl group-containing monomers such as N-butoxy-methylmethacrylamide and N-butoxymethylacrylamide; and epoxy group-containing monomers such as glycidyl methacrylate, glycidyl acrylate and allyl glycidyl ether. These monomers may be used either alone or in the form of a combination of two or more of them. The functional group-containing monomer is used in an amount of about 5 to about 40% by weight of total monomers. Examples of the monomers copolymerized with these functional group-containing monomers include olefinically unsaturated monomers such as ethylene, propylene and isobutylene; aromatic monomers such as styrene, vinyltoluene and alphamethylstyrene; ester of methacrylic acid and alcohols of 1 to about 18 carbon atoms such as methylmethacrylate, ethylmethacrylate, propylmethacrylate, n-butylmethacrylate, isobutylmethacrylate, cyclohexylmethacrylate, 2-ethylhexylmethacrylate and laurylmethacrylate; vinyl esters of carboxylic acid of about 2 to about 11 carbon atoms such as vinyl acetate, vinyl propionate and vinyl 2-ethylhexylic acid; as well as vinyl chloride, acrylonitrile and methacrylonitrile. They may be used either alone or in the form of a mixture of two or more of them.

The phenolic resins are any of the several types of synthetic thermosetting resins made by reacting a phenol, cresols, xylenols, p-t-butyl phenol, p-phenyl phenol, bis-phenols and resorcinol. Examples of the aldehydes include formaldehyde, acetaldehyde and furfural. Phenol-formaldehyde resins are a preferred class of such phenolic resins.

As mentioned above, the cross-linking resin is incorporated into the coating compositions of the present invention which are to be utilized as primer coatings on various substrates in order to improve the adhesion of any basecoat applied over the primer coating. The cross-linking resin forms bonds with the cross-linkable resins contained in the basecoat applied over the primer coating. The amount of cross-linking resin incorporated into the coating compositions of the present invention may be any amount up to about 65% by weight based on the weight of the olefin polymer contained in the coating composition.

The aqueous coating compositions of the invention may contain one or more conductive pigment in order to impart electroconductive properties to the coatings deposited from the aqueous coating compositions. Examples of conductive pigments include carbon, antimony and tin oxide mixtures, nickel, nickel flakes, steel flakes, bronze powder, aluminum powder, etc.

The amount of conductive pigment in the aqueous composition of the invention may range from about 0% to about 30% or more. When present in the coating composition, the range of conductive pigment will generally be from about 5% to about 60%.

Conductive pigments may be included in the coating compositions of the invention when the aqueous composition is to be used to deposit a primer coating on non-porous, non-conductive surfaces such as plastics. When an electroconductive primer is deposited on the plastic, the subsequent coat of paint can be applied by the electrostatic spray application techniques which are well-known to those skilled in this art.

Typically, an electric potential difference is created between the part to be painted and the paint to be applied. In this electric field, the particles of the atomized paint move toward the charged part and are deposited on the surface of the part.

The aqueous coating compositions of the present invention are characterized as having a VOC of less than about 3.5 pounds/gallon and more generally, a VOC of less than about 3.4 pounds/gallon. High-solids aqueous compositions also are contemplated as being within the present invention, and aqueous compositions of the present invention can be prepared containing up to about 50% by weight of solids. Generally, however, the solids content will be in the 20–35% by weight range. In addition to the components described above, the coated compositions of the present invention also may contain other conventional additives such as antioxidants, ultraviolet light absorbers, stabilizers, defoamers, levelling agents, etc.

The following examples illustrate the aqueous coating compositions of the present invention and methods for preparing the compositions. Unless otherwise indicated in the following examples and elsewhere in the specification and claims, all parts and percentages are by weight, temperatures are in degrees Farenheit, and pressure is at or near atmospheric.

EXAMPLE 1

A first aqueous mixture (grind paste) is prepared comprising about 14 parts of water and 0.41 part of hectorite clay (Bentone EW) by mixing at high speed until smooth. An additional 18.69 parts of water are added followed by 0.93 parts of Triton CF-10 (an alkyl aryl polyether non-ionic surfactant), 0.22 parts of a defoamer (Patcote 577 from C. J. Patterson Co.) and 19.48 parts of titanium dioxide. The mixture is subjected to a with high-speed grinding operation until a Cowles 7+ grind is achieved, and then, 1.43 parts of a thickener (SCT-270 from Union Carbide) are added.

In a separate tank, the following are premixed: 0.82 part of raw castor oil (plasticizer), 1.11 parts of the isopropyl amine salt of dodecylbenzene sulfonic acid (a hydrocarbon-soluble anionic emulsifier available from Witco Corporation under the designation "Witconate P-1059"), 0.46 part of Polytergent B-150 (a nonyl phenoxy polyethoxyethanol hydrocarbon-soluble non-ionic surfactant) and 16.27 parts of a 50% xylene solution of a chlorinated polyolefin (CP-343-3 from Eastman Kodak Company). To this mixture, there is added a separate mixture comprising 4.6 parts of xylene, 0.17 part of Tinuvin 1130 (an ultraviolet light absorber from Ciba-Geigy), and 0.09 part of Tinuvin 292 (a hindered amine light stabilizer from Ciba-Geigy). The above-prepared grind paste then is added to the tank and the contents of the tank are blended under high-speed agitation. When thoroughly blended, another premix comprising 15.87 parts of water and 0.46 part of hectorite clay (Bentone EW) is added and thoroughly blended. An additional 6 parts of water are added for viscosity adjustment. The mixture is filtered through 50 micron filter, and the filtrate is the desired composition containing 81.2% by volume of volatiles and characterized by a VOC of 3.38 pounds/gallon.

EXAMPLE 2

An aqueous mixture of 11.16 parts of water and 0.33 part of hectorite clay is prepared and mixed at high speed until smooth. There is then added 14.72 parts of water, 0.73 part of Triton CF-10, 0.18 part of defoamer (Patcoat 577) and 15.42 parts of titanium dioxide pigment. The mixture is then ground at high speed until a Cowles 7+ grind is achieved. To the ground mixture, there are added 1.13 parts of viscosity modifier (SCT-270), and the mixture is blended until smooth to yield the desired grind paste.

In a separate tank, the following are premixed: 0.65 part of castor oil, 0.88 part of Witconate P-1059, 0.37 part of Polytergent B-150 and 12.88 parts of a 50% xylene solution of the chlorinated polyolefin CP-343-3 from Eastman Kodak. To the tank, there is then added a premix comprising 3.64 parts of xylene, 0.13 part of Tinuvin 1130 and 0.07 part of Tinuvin 292. To this blend there is then added under high speed and with agitation, the grind paste prepared above. Subsequently, there is added a premix of 12.56 parts of water and 0.37 part of Bentone EW. Another premix containing 0.04 part of triethylamine, 3.33 parts of a methylated melamine-formaldehyde resin (CYMEL 373 resin from American Cyanamid Company) and 10.7 parts of water is added to the mixture in the tank with mixing. After standing overnight, 10.71 parts of water are added to adjust the viscosity, and the composition is filtered through a 50-micron filter. The composition contains 83% volume of volatiles and is characterized by a VOC of 3.21 pounds/gallon.

EXAMPLE 3

A grind paste is prepared comprising 5.49 parts of water, 0.09 part of defoamer (Patco 577), 0.06 part of triethylamine, 4.97 parts of 30% aliphatic urethane dispersion (Witcobond 240 from Witco Corporation), 7.85 parts of titanium dioxide and 0.603 parts of thickener (SCT-278). The mixture is subjected to a high-speed grinding operation until a 7+grind is achieved. To the ground mixture there is added 20 parts of water under agitation until the desired smooth grind paste is obtained.

In a separate tank, the following components are mixed: 4.0 parts of Synotex 800, a cyclized rubber commercially available from Daniel Products Company, 8.48 parts of aromatic solvent, 0.061 part of triethylamine, 2.91 parts of a water-reducible alkyd resin (Freeman 10-0091 from Freeman Chemical), 1.70 parts of CYMEL 373, a partially methylated melamine-formaldehyde resin from American Cyanamid Company. To this mixture there is then added slowly, the grind paste prepared above. When thoroughly blended, 43.48 parts of water and 0.10 part of a surface tension-modifying surfactant (DAPRO W-77, from Daniel Products) are added with agitation. The composition obtained in this manner is characterized by a VOC of about 3.40 pounds/gallon.

EXAMPLE 4

The process of Example 3 is repeated except that 5.30 parts of black conductive shading paste are added to the Synotex 800, alkyd, CYMEL 373 mixture prior to addition of the grind paste. The amount of water added after the grind paste is 38.17 parts rather than 43.48 parts. The composition of this example is characterized by a VOC of 3.40 pounds/gallon and a percent volatiles by volume of 84.43. This composition deposits an electroconductive film.

The aqueous compositions of the present invention are useful particularly as coating compositions for various substrates, especially non-porous substrates such as plastics and metal substrates. The aqueous compositions are useful particularly as primer coatings on such non-porous substrates and the coatings may be electroconductive or non-conductive. Examples of plastic substrates which can be coated with the compositions of the invention include polyolefins, polyesters (including fiber filled), polycarbonates, polyolefin-elastomer mixes, etc. The coating compositions of the present invention, when used as primer coatings, exhibit excellent adhesion to non-porous substrates. The aqueous compositions can be applied to the substrates by techniques known to those in the art such as by spraying, brushing, dipping, etc.

Once applied, the coating can be dried by heating to an elevated temperature of about 80° F. to about 400° F. The dry film thickness of primer coatings deposited on substrates usually ranges from about 0.2 mil to about 1.5 mils although greater film thicknesses can be deposited but generally are unnecessary.

The present invention also relates to a method of providing a substrate with a multi-layer coating and to multi-layer coated substrates produced by the method. Multi-layer coatings are obtained by the process which comprises (A) applying a film of the oil-in-water emulsions described above to a non-porous substrate as a primer coating;

(B) applying a pigmented coating composition to the primer-coated substrate of step (A), said pigmented coating composition comprising at least one thermosetting resin; and (C) heating the coated substrate obtained in step (B) to a temperature sufficient to at least partially cure the coated substrate. The application of the primer coating has been described above, and once the primer coating composition has been applied to the substrate, a second pigmented coating composition is applied to the primer-coated substrate which, for convenience, will be referred to herein either as a "top coat" when the second coating is the final coating, or as a "base coat" when a third coating composition (generally a clear coating composition is described hereinafter) is applied thereover. The pigmented coating composition can be applied over the primer coating wet-on-wet, that is, the primer-coated substrate can be subsequently coated without first being dried. Alternatively, the primer can be partially cured by baking prior to the application of the pigmented base coat. In one embodiment, for example, the primer coated substrate is baked for a period of from about 20 seconds to about 180 seconds at a temperature of about 80° F. to about 400° F. or higher prior to application of the pigmented base coat composition.

The pigmented base coat composition which is applied over the primer composition comprises, as indicated above, at least one thermosetting resin, at least one pigment and at least one solvent. Preferably, the thermosetting resin is a cross-linkable thermosetting resin capable of forming chemical bonds with the cross-linking resin contained in the primer coating. The interaction between the cross-linking resin in the primer coating in the cross-linkable thermosetting resin in the base coat results in improved and significant adhesion between the base coat and the primer coat. Examples of cross-linkable resins which can be utilized in the base coat include amino resins, alkyd resins, epoxy resins, acrylic resins, phenolic resins, saturated or unsaturated polyester resins, allyl resins and furan resins. The choice of cross-linkable thermosetting resin utilized in the base coat composition can be readily determined by one skilled in the art based upon the properties which are desired. For example, if a soft-flexible film is desired, the polyester resins can be utilized, and if a harder film is desired, amino resins, acrylic resins or epoxy resins may be selected.

The polyester resin which can be utilized in the base coat compositions may be either saturated or unsaturated polyester resins formed by condensing the polycarboxylic acid or anhydride (either saturated or unsaturated) with at least one polyhydric alcohol. Examples of saturated polyester resins include the products of the reaction of a saturated dicarboxylic acid or anhydride such as phthalic acid or anhydride, isophthalic acid, tetrahydrophthalic anhydride, hexahydrophthalic anhydride, succinic acid, glutaric acid, adipic acid, pimelic acid, suberic acid, azelaic acid and sebacic acid with a dihydric alcohol such as ethylene glycol, propylene glycol, butylene glycol, diethylene glycol, triethylene glycol, and neopentyl glycol. Small amounts of a polyhydric alcohol such as glycerol, pentaerythritol, trimethylolpropane or sorbitol may be used in combination with the glycol. The unsaturated polyester resins are characterized by the vinyl unsaturation and the polyester backbone. The unsaturated polyester resins are obtained by reaction of any of the above-described glycols and polyols with an unsaturated dicarboxylic acid or anhydride such as maleic anhydride, fumaric anhydride, chloromaleic acid, itaconic acid, citraconic acid and mesaconic acid.

The amino resins (sometimes referred to as polyalkylene amides) useful in the basecoat compositions are nitrogen-rich polymers containing nitrogen in the amino form, $-NH_2$. The starting amino-bearing material is usually reacted with an aldehyde (e.g., formaldehyde) to form a reactive monomer, which is then polymerized to a thermosetting resin. Examples of amino-bearing materials include urea, melamine, copolymers of both with formaldehyde, thiourea, aniline, dicyanodiamide, toluene sulfonamide, benzoguanamine, ethylene urea and acrylamide. Preferred amino resins are the melamine-formaldehyde and urea-formaldehyde resins.

The allyl resins are formed by the addition polymerization of compounds containing the allyl group ($CH_2=CHCH_2-$), such as esters of allyl alcohol and dibasic acids. Examples of allyl resins include diallylphthalate, diallylisophthalate, diallylmaleate and diallylchlorendate.

The furan resins which may be utilized in the basecoat compositions are obtained primarily by the condensation polymerization of furfuryl alcohol in the presence of strong acids, sometimes in combination with formaldehyde or furfuraldehyde. These furan resins also include resins made by condensing phenol with furfural alcohol or furfuryl, and furfuryl-ketone polymers.

The phenolic resins, alkyd resins, acrylic resins and epoxy resins used as cross-linkable thermosetting resins in the base coat compositions may be any of these resins which are described above as being a cross-linking component in the primer coating. The pigment included in the base coat formulation may be any of the pigments described above with respect to the primer coating. The choice of a particular pigment or pigments will be determined by one skilled in the art from a consideration of the characteristics and color desired for the base coat. The solvents may be aliphatic and/or aromatic solvents of the types normally used in paints. Also, as in the primer coating, conventional additives may be included in the base coat formulation such as surfactants, antioxidants, ultraviolet light absorbers, stabilizers, rheology control agents, coalescing agents, levelling agents, etc.

In another embodiment, a clear coating composition is applied to the substrate containing the primer coat or to the substrate which has been given a primer coating and a base coat. The clear coating composition can also be applied wet-on-wet over the primer or base-coat or, alternatively, the base coat composition can be partially cured by baking prior to the application of the clear coat. In one preferred embodiment, the base coat is baked for a period of about 20 seconds to about 180 seconds at a temperature of from 80° F. to about 400° F. or higher prior to application of the clear topcoat composition.

The clear coating composition comprises at least one solvent and at least one thermosetting resin, and the clear coating compositions can be formulated with the same types of solvents and additives as have been described above in connection with the primer coating composition. However, the clear compositions do not contain pigments. After the clear coating composition is applied to the substrate, the coated substrate is heated to a temperature sufficient to cure the coated substrate. Generally, temperatures of from about 80° F. to about 400° F. are sufficient to effect the cure. This final heating step removes the solvent present and causes the coating layers to fuse together in a bonding process. The coated substrates prepared in this manner and in accordance with the process and compositions of the present invention are characterized by superior adhesion of the coatings, abrasion resistance and resistance to weathering and industrial pollutants.

As with the primer coatings, the base coat and clear coat compositions can be applied to the substrate by techniques well known in the art. For example, the coating compositions can be applied by spraying, dipping, brushing, etc. The dry film thickness of the base coat may range from about 0.5 mil to about 2 mils, and the dry film thickness of the clear topcoat may range from about 0.2 mil to about 2 mils.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. An aqueous composition characterized by a VOC of less than about 3.5 pounds/gallon comprising effective amounts of:
   (A) at least one water-dispersible or emulsifiable olefin polymer;
   (B) at least one non-ionic surfactant;
   (C) at least one anionic surfactant;
   (D) at least one volatile hydrocarbon liquid; and
   (E) water.

2. The composition of claim 1 in the form of an oil-in-water emulsion.

3. The composition of claim 1 wherein polymer (A) comprises at least one cyclized olefin rubber, halogenated polyolefin, halosulfonated polyolefin, or mixtures thereof.

4. The composition of claim 1 wherein the polymer (A) comprises at least one cyclized olefin rubber obtained by isomerization of linear polyisoprene.

5. The composition of claim 1 wherein the polymer (A) comprises a mixture of at least one chlorinated polyolefin and at least one cyclized olefin rubber.

6. The composition of claim 1 wherein hydrocarbon liquid (D) is a mixture of aliphatic and aromatic hydrocarbons.

7. The composition of claim 1 wherein the VOC is less than about 3.4 pounds/gallon.

8. The composition of claim 1 wherein the composition is in the form of an invert oil-in-water emulsion.

9. The composition of claim 1 wherein (B) comprises at least one water-soluble non-ionic surfactant.

10. The composition of claim 1 also containing
    (F) at least one water-dispersible or emulsifiable cross-linking resin.

11. The composition of claim 1 also containing
    (G) at least one pigment.

12. The composition of claim 10 wherein the cross-linking resin is at least one aminoplast resin, urethane resin, acrylic resin, epoxy resin, alkyd resin, or mixtures thereof.

13. An oil-in-water emulsion having a VOC content of less than about 3.5 pounds/gallon which comprises:
   (A) from about 3% to about 25% by weight of at least one water-dispersible or emulsifiable olefin polymer;
   (B) from about 0.1% to about 5% by weight of at least one non-ionic surfactant;
   (C) from about 0.02% to about 2.5% by weight of at least one anionic surfactant;
   (D) from about 5% to about 20% by weight of at least one volatile hydrocarbon liquid; and
   (E) from about 40% to about 80% by weight of water.

14. The emulsion of claim 13 which is an invert emulsion.

15. The emulsion of claim 13 wherein the olefin polymer (A) is at least one cyclized olefin rubber, halogenated polyolefin, halosulfonated polyolefin, or mixtures thereof.

16. The emulsion of claim 13 wherein the polymer (A) comprises at least one cyclized olefin rubber obtained by isomerization of linear polyisoprene.

17. The emulsion of claim 13 wherein the polymer (A) comprises a mixture of a chlorinated polyolefin and cyclized olefin rubber.

18. The emulsion of claim 13 containing at least one water-soluble non-ionic surfactant.

19. The emulsion of claim 13 wherein the hydrocarbon liquid (D) is a mixture of aliphatic and aromatic hydrocarbons.

20. The emulsion of claim 13 also containing (F) at least one water-dispersible or emulsifiable cross-linking resin.

21. The emulsion of claim 20 wherein the cross-linking resin is at least one aminoplast resin, urethane resin, acrylic resin, epoxy resin, alkyd resin, or mixtures thereof.

22. The emulsion of claim 20 wherein the cross-linking resin is present in an amount of up to about 60% by weight based on the weight of the olefin polymer (A).

23. The emulsion of claim 13 also containing at least one electroconductive pigment.

24. A process for preparing low VOC oil-in-water emulsions of improved stability which comprises the steps of:
   (A) preparing an aqueous mixture comprising an effective amount of at least one water-soluble non-ionic surfactant;
   (B) preparing a mixture of effective amounts of at least one olefin polymer, at least one anionic surfactant, and at least one hydrocarbon solvent; and
   (C) adding the aqueous mixture prepared in step (A) to the hydrocarbon mixture prepared in step (B) with agitation to form an invert oil-in-water emulsion.

25. The process of claim 24 wherein the aqueous mixture prepared in step (A) also contains at least one pigment.

26. The process of claim 24 wherein at least one water-dispersible or emulsifiable cross-linking resin is added to mixture prepared in step (B) or to the emulsion obtained in step (C).

27. The process of claim 26 wherein the cross-linking resin is at least one aminoplast resin, urethane resin, acrylic resin, epoxy resin, alkyd resin, or mixtures thereof.

28. The process of claim 24 wherein the olefin polymer in the mixture prepared in step (B) comprises at least one cyclized olefin rubber, halogenated polyolefin, halosulfonated polyolefin, or mixtures thereof.

29. The process of claim 26 wherein up to about 60% by weight, based on the weight of olefin polymer of at least one cross-linking resin is added in step (B) or step (C).

30. The oil-in-water emulsion prepared in accordance with the process of claim 24.

31. The oil-in-water emulsion prepared in accordance with the process of claim 26.

32. A process for coating substrates with an adherent primer coating which comprises the steps of
    (A) applying a film of the aqueous composition of claim 1 to a substrate; and
    (B) heating the film to form the desired adherent coating on the substrate.

33. The process of claim 32 wherein the substrate is a non-porous substrate.

34. The process of claim 33 wherein the non-porous substrate is a plastic substrate.

35. The process of claim 34 wherein the plastic substrate is selected from the group consisting of polyolefins, polyesters, polycarbonates and polyolefin/elastomer mixtures.

36. The process of claim 32 wherein the film is heated in step (B) to a temperature of from about 80° F. to about 400° F.

37. A process for coating non-porous substrates with an adherent primer coating which comprises the steps of
    (A) applying a film of the oil-in-water emulsion of claim 30 to a non-porous substrate; and
    (B) heating the film to form the desired adherent coating on the substrate.

38. The process of claim 37 wherein the non-porous substrate is a plastic substrate.

39. The process of claim 38 wherein the plastic substrate is selected from the group consisting of polyolefins, polyesters, polycarbonates and polyolefin/elastomer mixtures.

40. The process of claim 37 wherein the film is heated in step (B) to a temperature of from about 80° F. to about 400° F.

41. A process for coating non-porous substrates with an adherent primer coating which comprises the steps of
    (A) applying a film of the oil-in water emulsion of claim 31 to a non-porous substrate; and
    (B) heating the film to form the desired adherent coating on the substrate.

42. The process of claim 41 wherein the non-porous substrate is a plastic substrate.

43. The process of claim 42 wherein the plastic substrate is selected from the group consisting of polyolefins, polyesters, polycarbonates and polyolefin/elastomer mixtures.

44. The process of claim 41 wherein the film is heated in step (B) to a temperature of from about 80° F. to about 400° F.

45. A process of providing a non-porous substrate with an adherent multi-layer coating comprising
    (A) applying a film of the oil-in-water emulsion of claim 30 to a non-porous substrate as a primer coating;
    (B) applying a pigmented coating composition to the primer-coated substrate of step (A), said pigmented coating composition comprising at least one thermosetting resin; and
    (C) heating the coated substrate obtained in step (B) to a temperature sufficient to at least partially cure the coated substrate.

46. The process of claim 45 wherein the substrate is a plastic substrate.

47. A process of providing a non-porous substrate with an adherent multi-layer coating comprising
    (A) applying the film of the oil-in-water emulsion of claim 31 to a non-porous substrate as a primer coating;
    (B) applying a pigmented coating composition to the primer-coated substrate of step (A) wherein said pigmented coating composition comprises at least one cross-linkable thermosetting resin; and
    (C) heating the coated substrate obtained in step (B) to a temperature sufficient to at least partially cure the coated substrate.

48. The process of claim 47 wherein the non-porous substrate is a plastic.

49. The process of claim 45 wherein the coated substrate obtained in step (B) is coated with a clear topcoating composition comprising a thermosetting polymer prior to heating step (C).

50. The process of claim 47 wherein the coated substrate obtained in step (B) is coated with a clear. topcoating composition comprising a thermosetting polymer prior to heating step (C).

51. A non-porous substrate coated in accordance with the process of claim 32.

52. A non-porous substrate coated in accordance with the process of claim 37.

53. A non-porous substrate coated in accordance with the process of claim 41.

54. A non-porous substrate coated in accordance with the process of claim 45.

55. A non-porous substrate coated in accordance with the process of claim 47.

56. A non-porous substrate coated in accordance with the process of claim 49.

57. A non-porous substrate coated in accordance with the process of claim 50.

* * * * *